Feb. 3, 1948.  W. R. GOOD  2,435,389
STOP LIGHT SWITCH FOR AUTOMOBILES
Filed Jan. 19, 1946
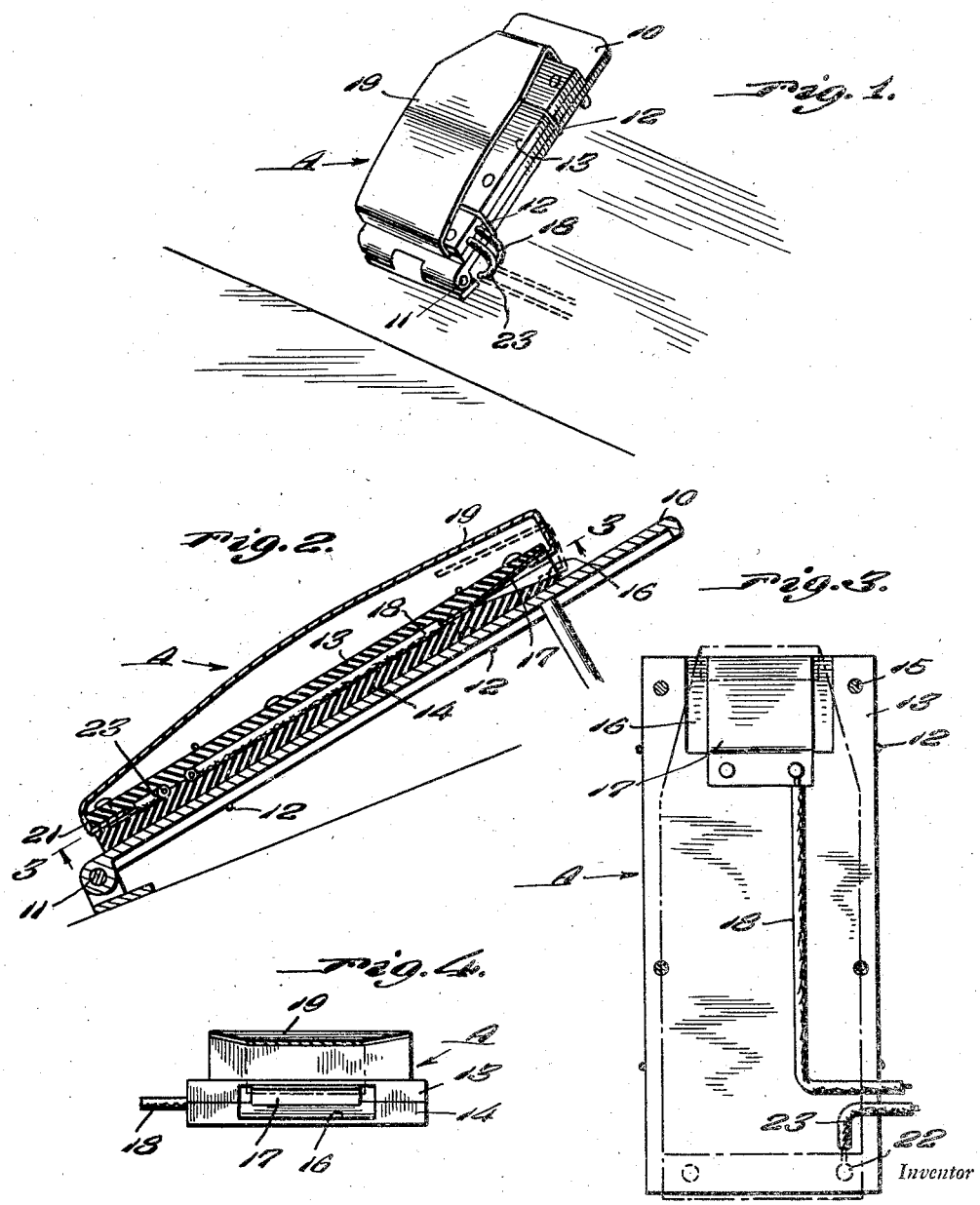
Inventor
Wilford R. Good
By Clarence A. O'Brien
and Harvey B. Jacobson
Attorneys Patented Feb. 3, 1948

2,435,389

UNITED STATES PATENT OFFICE 2,435,389

STOP LIGHT SWITCH FOR AUTOMOBILES

Wilford R. Good, Clio, Mich.

Application January 19, 1946, Serial No. 642,239

1 Claim. (Cl. 200—59)

My invention relates to a stop light switch for automobiles which will give advance warning to a following vehicle, when the operator of said automobile prepares to stop or slows down his machine.

The conventional switch commonly used gives no warning until the brakes are actually being applied and the automobile is actually stopping before the vehicle following gets any warning of the operator's intention of change in running.

By the use of my switch many accidents caused by rear end collisions, now so common, would surely be averted on the highways.

This safety switch is so arranged that a warning signal, such as a light or a sound or both is immediately actuated directly the operator takes his foot off the accelerator pedal, thereby giving the driver of a following vehicle several seconds advance warning before an impending stop or slow down of a preceding automobile takes place.

For this reason, the preferred embodiment of my invention is illustrated on the accompanying drawing with such switch situated on top of the accelerator pedal, the switch unit itself may constitute the accelerator or it may be placed side by side of the same.

In the different views of the accompanying drawing the same reference characters refer to the same parts in the several figures.

Figure 1 represents a light switch in position on top of an accelerator on the floor of an automobile and in perspective view.

Figure 2 is a longitudinal section in about natural size.

Figure 3 is a bottom plan view of the upper board of the switch or a section along line 3—3 of Figure 2.

Figure 4 is a front view of the switch itself with some parts removed.

In the drawing, reference numeral 10 is the accelerator pedal in its raised free position, hinged as at 11 on top of the foot board of an automobile.

The switch unit A is rigidly attached on top of pedal 10 as by wires 12 encircling the same and the pedal 10. The switch consists of two rectangular boards 13 and 14 made of insulating material such as wood, "spouldite" or the like, a suitable size of which may be about 2 inches wide, 4¼ inches long and ⅛ inch thick, which are laid one atop the other as seen in Figure 2, and firmly secured together as by screws or rivets 15.

At the front or upper end of the two boards 13, 14 a wedge shaped recess 16 is provided in which is secured a small contact plate 17 attached as by rivets to the upper board 13. To this plate 17 is secured the end of the stop light wire 18. Accordingly, plate 17 may be attached to board 14 instead.

Covering the greater part of the insulating board 13 and spaced above the same as best shown in Figure 2 is provided the actual switch member 19 with its nose or front end 20 bent down in hook fashion to normally engage in the aperture 16 in contact with the plate 17. The aperture 16 permits an up and down movement of about ⅜ inch of the nose 20. The rear or lower end 21 is likewise bent down over the rear end of the insulation board 13 and secured between the two boards 13, 14 as by a rivet 22 together with the negative wire 23 for the switch light, not shown.

This switch member 19 is preferably made of spring brass about 5½ inches long before bending 0.015 inch thick and 2 inches wide arcuately bent between front and rear ends 20, 21 so as to be spaced about ¾ inch above the upper board 13.

The operation of this device is the following:

Figure 2 represents the parts in position ready for the operator to start the car. That is to say, the accelerator pedal 10 is in its raised position and no gasoline fed to the motor. The spring switch 19 being secured by contact rivet 22 between the boards 13, 14 at the rear or hinged end 21 of the accelerator pedal 10, then by its own springiness makes contact between its nose 20 and the plate 17 connected with wire 18 completing the light circuit through wire 23 and rear end parts 21, 22. This means that the switch light is then burning.

To start the motor, the operator now places his foot on the pedal as usual, but, because the switch plate 19 covers the top of the pedal 10, the operator is thus compelled to communicate pressure on the pedal 10 through the switch plate and in doing so releases the contacts 17, 20, thereby turning out the light signal. As long as he is driving, whether at full speed or merely idling, no signal is given, but as soon as he releases the pressure on the pedal, contacts 17, 20 become closed and the warning signal is given.

It will thus be evident that immediately the operator removes his foot from the accelerator pedal and before he can apply his brake by pressure on his brake pedal, a warning signal is given to a following motorist.

This switch having been described mainly as applied to light signals, it will, however, be evident that it may be used for other signals such as buzzers or other sound warnings.

It is to be understood that the invention as here disclosed is not limited to the details here described and shown but that the same may be varied without departing from the spirit of the invention as defined by the subjoined claim.

I claim:

A stop light switch adapted detachably to be secured to the accelerator pedal of a motor vehicle comprising a body of electrical insulating material extending substantially throughout the length and breadth of the accelerator pedal, said body having a substantially V-shaped recess in its upper end, a contact plate on the upper convergent wall of the recess, a treadle of yielding conducting material fixed to the body at the end opposite the recess, said treadle being of a length and breadth coincident with the length and breadth of the body and lying in spaced relation to the top surface of the body, an inturned tongue of conducting material on the end of the treadle opposite the fixed end, said tongue extending into the recess and engaging the contact plate when there is no pressure on the treadle.

WILFORD R. GOOD.

REFERENCES CITED

The following references are of record in the file of this patent:

UNITED STATES PATENTS

| Number | Name | Date |
| --- | --- | --- |
| 1,498,580 | Rule | June 24, 1924 |
| 2,096,069 | Seiden | Oct. 19, 1937 |
| 2,128,769 | Finnell | Aug. 30, 1938 |
| 1,956,056 | Bellae et al. | Apr. 24, 1934 |